United States Patent Office 2,967,156
Patented Jan. 3, 1961

2,967,156

PHOSPHATED KAOLIN CRACKING CATALYST

Gerhardt Talvenheimo, Chester, Pa., assignor to Houdry Process Corporation, Wilmington, Del., a corporation of Delaware No Drawing. Filed Feb. 27, 1956, Ser. No. 567,715

2 Claims. (Cl. 252—437)

The present invention relates to the activation of clays and is particularly concerned with the preparation therefrom of catalysts of desired physical strength having enhanced activity for cracking and other catalytic conversion of hydrocarbons.

Conventional methods in commercial use for preparing catalysts of desired activity as well as useful decolorizing agents from sub-bentonite clays of the montmorillonite family involve leaching of the clay with aqueous mineral acid at about 200° F. thereby effecting removal of a portion of the alumina content of the clay and simultaneous removal of part of the acid-soluble undesirable components therefrom such as iron and alkali metal compounds. This procedure has also been applied in the attempted activation of clays of the kaolin family, but catalysts having the desired stable activity and other properties required for commercial adoption in existing catalytic cracking processes have not generally been obtained thereby.

It has also been proposed to activate natural mineral products including clays of the kaolin as well as those of the montmorillonite class by incorporating therein acid reacting materials and subjecting the admixture to roasting for effecting reaction between the acid and components of the mineral, followed by washing to remove soluble conversion products thus formed (U.S. Patent 2,582,956 of January 22, 1952).

Methods for activation of clays using liquid sulfuric acid are also known in which the raw clay is mixed with concentrated $H_2SO_4$ followed by aging or denning at elevated temperature to complete the sulfation reaction; the sulfated clay being then mixed with water to effect dissolution of soluble sulfates. It has also been proposed to subject sulfated clays to thermal decomposition at temperatures in excess of 1100° F. followed by treatment with acid solvent to remove alumina and other acid soluble components leaving a residue composed largely of silica.

By the method of the present invention, moreover, even raw kaolin clays of initially poor plasticity can be formed into granules and pellets having high resistance to crushing, abrasion and attrition, and even such raw kaolin clays, which are not brought to acceptably high catalytic activity levels by the usual or known methods of acid treatment, when processed in accordance with the present invention produce catalysts of satisfactory performance characteristics retaining their activity in use over a long period.

In particular, the active contact masses of the present invention have vastly superior hardness characteristics, when compared with kaolins which have undergone sulfuric acid activation by means other than that employed in the process of the present invention. Moreover, the active contact masses of the present invention have improved properties conducive to lower coke formation.

In accordance with the present invention, the desired contact masses are prepared by pretreatment and then acid activated and treated in accordance with the method set forth below.

Various methods are available for the initial pretreatment of the kaolin clay. A simple but practicable technique involves grinding of the raw clay, preferably after washing and desilting to remove physically admixed non-clay materials.

After the pretreatment, the clay is subjected to thorough mixing with a solution of sulfuric and phosphoric acids, using a quantity of such acid mixture sufficient at least to react with part of the alumina content of the clay. The mixing of the clay and acid may be done in a pug mill or other suitable mixing device.

A wide range in the respective amounts of sulfuric acid and phosphoric acid compositions may be utilized in the process of the present invention. Thus, mixtures having a total combined acid strength of 10 percent by weight to 85 percent by weight to the dry weight of the clay, and preferably mixtures comprising a sufficient quantity of acid to furnish from 25% to 80% by weight of acid to the dry weight of the clay may be utilized.

A very important feature of the present invention is the incorporation of phosphoric acid in the sulfuric acid, however, the relative concentration of the sulfuric acid to the phosphoric acid in the acid solution may be varied over a wide range. Preferred solutions are those comprising 10 to 85% by volume of 100% $H_2SO_4$ and 1 to 50% of 100% $H_3PO_4$, with water comprising the remainder of the solution where necessary. It is to be understood that while the description is in terms of phosphoric acid, the invention is not limited thereto and suitable substitutes providing phosphorous in acid form, such as $P_2O_5$, may be employed.

By proper selection of the quantity and concentration of acid, an acid-clay mix of desired extrusion consistency can be provided which does not require any further adjustment of liquid content prior to extrusion. Thus, with typical kaolin clays this can be generally accomplished by mixing about 30 to 80 weight percent liquid by weight of dry clay. If the total liquid content provided by the acid employed results in too stiff a mix, it will be understood that additional quantities of water may be added to adjust the mix to desired extrudable consistency.

After thorough mixing of the clay and acid to form a composition of extrudable consistency, the mix is extruded through die plates having orifices of desired size and the extruded strands are cut or broken to desired lengths. Conventional finished clay catalyst pellets, after calcination, are generally cylindrical and of about 2 to 6 millimeters diameter and of about the same length. The wet pellets are accordingly produced so as to fall in the desired size range on subsequent treatment including drying and calcination.

While extrusion has been particularly described as a convenient manner of producing the desired hard catalyst pellets, it will be understood that other methods of pelleting might be employed including casting, compacting, prilling or other known techniques used in tablet and pellet formation. The catalyst may be formed into other than cylindrical pellets, such as discs, rings, spheres or other desired shapes.

The activated clay is then denned in the presence of a liquid hydrocarbon, such as a light oil, at 250° F. to 400° F. or more, up to, but below the decomposition temperature of the impregnated sulfuric acid, and retained within said light oil for a time adequate to assure complete reaction of the sulfuric acid.[1] In other

---

[1] Heating of the clay as aforesaid is generally known in the art as denning.

embodiments, the activated clay may be denned with pure steam at a temperature of between 250 and 350° F., or with an air saturated with steam mixture having a wet bulb temperature of from 190° F. to 210° F. and a dry bulb temperature of from 250° F. to 350° F.

We have found that there is little or no reaction between the impregnated phosphoric acid and the kaolin at the aforesaid denning temperatures, and accordingly complete activation of the clay may be accomplished by the sulfuric acid without adverse interference from the phosphoric acid. The denning effected in accordance with the process of the present invention appears to be as effective as when the phosphoric acid is not present in the acid-clay mixture.

The desulfation treatment may be accomplished in any one of a number of ways but not necessarily with equal results. In the preferred practice desulfation is effected at temperatures above 750° F. and in the presence of a reducing agent which converts the sulfate radical or the SO$_3$ released therefrom at the elevated temperature, to a lower oxide of sulfur, which is driven off. Reducing agents that can be employed for this purpose include gases or vapors such as hydrogen, carbon monoxide, hydrogen sulfide, sulfur, ammonia, methane. Not all of these are equally effective under the same temperature conditions. Hydrogen sulfide, for example, works effectively at a minimum temperature in the order of 750° F. to 800° F. while methane requires a considerably higher temperature in the order of 1400–1450° F. All of the other named reducing agents are effective at a minimum temperature between 1000 and 1400° F. Desulfation may be carried out in the absence of reducing agent, and particularly in an atmosphere containing over 10% and at least 25% steam, but as thermal desulfation does not proceed at a reasonably rapid rate below 1500° F., this embodiment requires considerably greater heat input, and is difficult to control because of the possibility of inducing an exothermic reaction, such as in crystal transformation, which might take place at these high temperatures.

The manner of carrying out the desulfation is important from the standpoint of the ultimate physical and catalytic properties of the finished catalyst pellets. Thus, it has been found that the presence of steam during the reduction or other decomposition of the sulfate in the clay results in the production of catalyst of reduced coking tendency; that is, the catalyst thus obtained shows comparatively better gasoline/coke ratios in hydrocarbon cracking under conventional operating conditions than similarly prepared kaolin catalysts in which steam is not employed. As a possible alternative the decomposition of the sulfate, particularly by reduction, might be carried out in the absence of steam, and the desulfated clay then subjected to steaming at a temperature above about 1000° F. to about 1550° F. or short of that which would cause initiation of sintering of the clay. This subsequent steaming step also tends to reduce the coking tendency of the catalyst but it is nevertheless preferred to employ steam during the decomposition of the sulfate, not only because of convenience of operation, but also because repeated production of catalysts of lowest coking tendency is thus better assured.

In the preferred operation, desulfation of the sulfated kaolin pellets is carried out at temperatures in the range of 1100–1600° F., better at 1350° F. or above, employing a reducing gas mixture composed of steam and hydrogen. At temperatures of 1300° F. and above the gas may contain as little as 1 mol percent hydrogen and be effective. At lower temperatures, higher concentrations of reducing agent in the gas mixture are required. Instead of or in addition to the hydrogen, carbon monoxide may be employed in about the same total ratio in the mixture of reducing gas to steam as hereinbefore described in the case of hydrogen alone. Carbon monoxide alone is less efficient than hydrogen at temperatures below 1200° F.

When hydrogen sulfide is used as the reducing gas, with or without the simultaneous presence of steam, lower temperatures are effective from about 750° F. To assure the production of catalysts of low coking tendencies, however, with perhaps some gain in catalyst activity, the desulfated clay should be subjected to a subsequent steaming operation at temperatures above 1350° F. and preferably at 1500–1600° F. Reference is made to Donovan 2,904,520 describing some methods of desulfating clay in steam containing a hot reducing gas.

When hydrogen sulfide is employed at temperatures of 1050° F. or higher any iron present in combined form in the clay lattice may be freed and thereby activated. In such case it is best to remove the liberated iron, which can be readily accomplished by treatment with NH$_4$Cl vapor.

In general whenever reduction is carried out in the absence of steam, the subsequent steaming should be carried out at above 1350° F. and preferably in the 1400–1600° F. temperature range using 100% steam or diluted with up to about 70–80% inert gas.

As indicated above, decomposition of the sulfate can be effected in a steam atmosphere without reducing agents if at sufficiently high temperature, but not necessarily with equal facility or effectiveness, as when using reducing agents.

In the reduction process of decomposing sulfate the initial reaction illustrated in Equation I below is endothermic; the second stage Reaction II is exothermic.

(I) 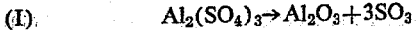
$$Al_2(SO_4)_3 \rightarrow Al_2O_3 + 3SO_3$$

(II) $$3SO_3 + 3H_2 \rightarrow 3SO_2 + 3H_2O$$

Hence, once the reaction illustrated in Equation I has been initiated, the reduction of the SO$_3$ supplies at least a part of the heat required to further the decomposition of the aluminum sulfate.

It is presently believed that coke formation from sulfuric acid activated kaolins is due to free alumina (uncombined and aggregated) formed from crystallized aluminum sulfate hydrate which is produced from a reaction between the sulfuric acid and the kaolin during denning.

While we do not wish to be bound by any theory as to the basis for the efficacy of the process of the present invention, it is our belief that the process of the present invention is effective because of the elimination of excessive uncombined alumina, and probably also due to the formation of an aluminum phosphate compound. It is also our belief that the increased pellet hardness of the catalysts produced by the process of the present invention is probably due to the binding properties conferred upon such pellets by the aforesaid aluminum phosphate compound.

EXAMPLE I.—CONTROL CATALYST PREPARATION 10 kilograms of a kaolin clay were mixed with 3.3 liters of 59.32% sulfuric acid (acid density equal to 1.493) for about 20 minutes and mixed by means of a solids mixer. The mix was then extruded by a worm extruder. Immediately after extrusion, the wet pellets were placed into an oil bath at 300° F. and denned therein for four hours. The denned clay contained 34.04 weight percent of 100% sulfuric acid on an ignited clay basis.

The denned clay was reduced at 1350° F. for four hours with a mixture of 10% hydrogen and 90% steam; and a portion was further heat-treated at 1550° F. for four hours with 100% steam.

The properties of the catalysts obtained, after these treatments, are summarized in Table 1.

Table 1
No Phosphoric Acid

|  | After Reduction | After Heat Treating |
|---|---|---|
|  | 4 Hr., 1,350° F., 10% H², 90% Steam | 4 Hr., 1,550° F., 100% Steam |
| Physical Properties: |  |  |
| Surface Area, m.²/g | 52.6 | 30.7 |
| Hardness, Knife Edge | ca. 5,100 | 5,000 |

Knife edge hardness is expressed in grams and is determined by loading a knife edge (of the type used in analytical balances), placed upon the cylindrical surface of the pellet, normal to the axis, until the pellet breaks.

The catalytic behavior of the above catalyst was determined by the standard CAT-A method (see "Laboratory Method for Determining the Activity of Cracking Catalysts," by J. Alexander and H. G. Shimp, page R537, National Petroleum News, August 2, 1944) in cracking of a light gas oil at standardized conditions, with the following results:

| Gasoline, vol. percent chg | 30.0 | 25.8 |
|---|---|---|
| Coke, wt. percent chg | 2.3 | 1.3 |
| Gas, wt. percent chg | 5.2 | 2.3 |
| Gas Gravity (air equals 1) | 1.23 | 1.21 |

EXAMPLE II

Five hundred grams of kaolin similar to that used in Example I were mixed with 165 milliliters of a combined sulfuric acid and phosphoric acid solution (made up by mixing 150 milliliters of 65% sulfuric acid with 50 milliliters of 85% phosphoric acid) in a solids mixer for about fifteen minutes. The acid-clay mix was then extruded and pelleted by manual cutting of the strands over a thirty minute interval. The pellets were then denned at 300° F. for four hours with heated circulating air. The denned catalyst contained 29.10 weight percent of 100% sulfuric acid and 13.79 weight percent of 100% of phosphoric acid, all on an ignited clay basis.

The denned catalyst was then reduced at 1,350° F. for four hours with a mixture of 10% hydrogen and 90% steam. The properties of the catalyst obtained are summarized in the table below:

Table 2

Physical properties:
  Surface area sq. m./g. _____ 43.0
  Knife edge hardness (grams) _____ 13,000 plus The catalytic behavior of the above catalyst was determined by the standard CAT-A method with the following results:

Gasoline, vol. percent charge _____ 25.6
Coke, wt. percent charge _____ 1.3
Gas, wt. percent charge _____ 2.8
Gas gravity (air equals 1) _____ 1.20

It will be noted by comparing the hardness characteristics of the catalyst prepared in Example II with those prepared in Example I, that the former is vastly superior. In addition, it is to be noted that the catalyst of Example II after the reduction treatment alone has an improved lower coke-forming nature which is achieved with the catalyst of Example I only after an additional and more severe heat treatment.

The present invention may be embodied in other specific forms without departing from the spirit or essential attributes thereof and, accordingly, reference should be made to the appended claims, rather than to the foregoing specification as indicating the scope of the invention.

It is claimed:

1. The method of preparing attrition resistant particles of active cracking catalyst which consists essentially of the steps of: thoroughly admixing kaolin clay with an acidic solution in an amount in the range of 30 to 80% weight of liquid to weight of dry clay, said acidic solution containing 10 to 85% by volume of 100% $H_2SO_4$, 1 to 50% by volume of 100% $H_3PO_4$ and any remaining volume percent of water, whereby metal sulfates are formed in the kaolin clay; maintaining the admixture at a temperature within the range from about 250° F. to about 400° F. to obtain a more complete reaction between the acid and clay; treating the thus heated reaction product to bring about a complete decomposition of said metal sulfates with evolution of sulfur-oxide gases, said decomposition being effected in the presence of a gas mixture consisting essentially of a reducing gas and steam at a temperature in the range of 750° to 1600° F.; and recovering from said sulfate decomposition step, phosphate-containing clay particles having enhanced hardness and lower coke-forming tendency as an active cracking catalyst.

2. The method of preparing attrition resistant particles of active cracking catalyst which consists essentially of the steps of: thoroughly admixing kaolin clay with an acidic solution to provide about 30% sulfuric acid and about 14% phosphoric acid, said solution containing about 48% sulfuric acid and about 21% phosphoric acid, whereby metal sulfates are formed in the kaolin clay; maintaining the admixture at about 300° F. for about four hours to obtain a more complete reaction between the acid and clay; treating the thus heated reaction product to bring about a complete decomposition of said metal sulfates with evolution of sulfur-oxide gases, said decomposition being effected in the presence of a gas mixture consisting essentially of about 10% hydrogen and about 90% steam at a temperature of about 1350° F. for about four hours; and recovering from said sulfate decomposition step, phosphate-containing clay particles having enhanced hardness and lower coke-forming tendency as an active cracking catalyst.

References Cited in the file of this patent
UNITED STATES PATENTS

| 1,492,184 | Weir et al. | Apr. 29, 1924 |
|---|---|---|
| 2,066,212 | McKellar | Dec. 29, 1936 |
| 2,132,349 | Booth | Oct. 4, 1938 |
| 2,192,000 | Wilson | Feb. 27, 1940 |
| 2,339,594 | Williams | Jan. 18, 1944 |
| 2,454,056 | Greger | Nov. 16, 1948 |
| 2,485,626 | Mills | Oct. 25, 1949 |
| 2,524,866 | Winslow | Oct. 10, 1950 |
| 2,579,576 | Hickey | Dec. 25, 1951 |

FOREIGN PATENTS

| 239,169 | Great Britain | July 6, 1926 |
|---|---|---|